(12) United States Patent
Nakagawa et al.

(10) Patent No.: US 12,139,205 B2
(45) Date of Patent: Nov. 12, 2024

(54) WORK VEHICLE

(71) Applicant: KUBOTA CORPORATION, Osaka (JP)

(72) Inventors: Takateru Nakagawa, Sakai (JP); Susumu Ooki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/277,799

(22) PCT Filed: Mar. 9, 2022

(86) PCT No.: PCT/JP2022/010417
§ 371 (c)(1),
(2) Date: Aug. 18, 2023

(87) PCT Pub. No.: WO2022/209682
PCT Pub. Date: Oct. 6, 2022

(65) Prior Publication Data
US 2024/0132168 A1    Apr. 25, 2024
US 2024/0227955 A9    Jul. 11, 2024

(30) Foreign Application Priority Data
Mar. 29, 2021    (JP) .................... 2021-056313

(51) Int. Cl.
*B62D 49/00*    (2006.01)
*B60R 21/13*    (2006.01)
(Continued)

(52) U.S. Cl.
CPC ........ *B62D 49/0678* (2013.01); *B60R 21/131* (2013.01); *B60R 2021/0018* (2013.01)

(58) Field of Classification Search
CPC .... B62D 49/0678; B62D 49/06; B62D 49/00; B60R 21/131; B60R 21/13; B60R 21/00;
(Continued)

(56) References Cited

U.S. PATENT DOCUMENTS 4,049,294 A * 9/1977 Atherton ............... B60R 21/131
296/102
4,158,460 A * 6/1979 White .................. B60R 21/131
403/3

(Continued)

FOREIGN PATENT DOCUMENTS

JP    07-304468 A    11/1995
JP    2016-097930 A    5/2016
(Continued)

OTHER PUBLICATIONS

Official Communication issued in International Patent Application No. PCT/JP2022/010417, mailed on Apr. 26, 2022.

*Primary Examiner* — Keith J Frisby
(74) *Attorney, Agent, or Firm* — Keating & Bennett, LLP

(57) ABSTRACT

In a work vehicle, a safety frame includes a base, a pair of left and right lower frames extending from the base and fastened to a pair of left and right rear wheel fenders, and an upper frame having an inverted U shape connecting upper portions of the pair of left and right lower frames. The base is removably fastened to a rear axle case. A length in a width direction between a pair of left and right rear wheels is changed by changing a length in a width direction of the upper frame and changing a fastening position of the base to the rear axle case.

4 Claims, 5 Drawing Sheets

(51) Int. Cl.
  *B62D 49/06* (2006.01)
  *B60R 21/00* (2006.01)
(58) Field of Classification Search
  CPC ........ B60R 2021/0018; B60Y 2200/22; B60Y 2200/221; B60Y 2200/222
  USPC .......................................... 180/209; 280/756
  See application file for complete search history.

(56) References Cited

U.S. PATENT DOCUMENTS

| | | | | | |
|---|---|---|---|---|---|
| 4,159,835 | A | * | 7/1979 | Leja | ...................... B60R 21/131 296/102 |
| 4,666,183 | A | * | 5/1987 | Azzarello | ............. B60R 21/131 296/102 |
| 5,503,430 | A | * | 4/1996 | Miki | ..................... B60R 21/131 280/756 |
| 5,779,272 | A | * | 7/1998 | Panek | ................... B60R 21/131 280/756 |
| 7,971,905 | B2 | * | 7/2011 | McCord | ................ B60R 21/131 280/756 |
| 2010/0187799 | A1 | * | 7/2010 | Schmidt | ................ B60R 21/131 280/756 |
| 2011/0233909 | A1 | * | 9/2011 | Fukunaga | ............. B60R 21/131 280/756 |
| 2015/0083515 | A1 | * | 3/2015 | Tani | ..................... B62D 25/168 180/346 |
| 2017/0120677 | A1 | * | 5/2017 | Park | ..................... B60K 17/165 |

FOREIGN PATENT DOCUMENTS

| | | |
|---|---|---|
| JP | 2016-222069 A | 12/2016 |
| JP | 6534860 B2 | 6/2019 |
| JP | 7150081 B1 | 10/2022 |

* cited by examiner

WORK VEHICLE

CROSS REFERENCE TO RELATED APPLICATION

This is a U.S. National Phase Application under 35 U.S.C. § 371 of International Patent Application No. PCT/JP2022/010417, filed on Mar. 9, 2022, which claims priority of Japanese Patent Application No. 2021-056313, filed on Mar. 29, 2021. The entire contents of each application are hereby incorporated herein by reference.

BACKGROUND OF THE INVENTION

1. Field of the Invention

The present invention relates to a work vehicle.

2. Description of the Related Art

Conventionally, there has been known a work vehicle that enables a length (tire width) in a width direction between a pair of left and right rear wheels to be adjusted (see, for example, Japanese Patent No. 6534860).

SUMMARY OF THE INVENTION

However, the work vehicle disclosed in Japanese Patent No. 6534860 has the problem that the shape of the two fenders for adjusting the tire width becomes complicated.

Therefore, preferred embodiments of the present invention provide work vehicles that each enable a tire width to be adjusted without complicating the shape of fenders.

A work vehicle according to a preferred embodiment includes a driver seat at a rear of the work vehicle, a pair of left and right rear axles on which a pair of left and right rear wheels are mounted, a pair of left and right rear axle cases to support the pair of left and right rear axles, a pair of left and right rear wheel fenders on left and right sides of the driver seat to cover an upper side of the pair of left and right rear wheels, and a safety frame between the pair of left and right rear wheel fenders at a rear of the driver seat. The safety frame includes a base, a pair of left and right lower frames extending from the base and fastened to the pair of left and right rear wheel fenders, and an upper frame having an inverted U shape connecting upper portions of the pair of left and right lower frames. The base is removably fastened to the rear axle cases. A length in a width direction between the pair of left and right rear wheels is changed by changing a length in a width direction of the upper frame and changing a fastening position of the base to the rear axle cases.

According to preferred embodiments of the present invention, it is possible to provide a work vehicle that enables a tire width to be adjusted without complicating the shape of fenders.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
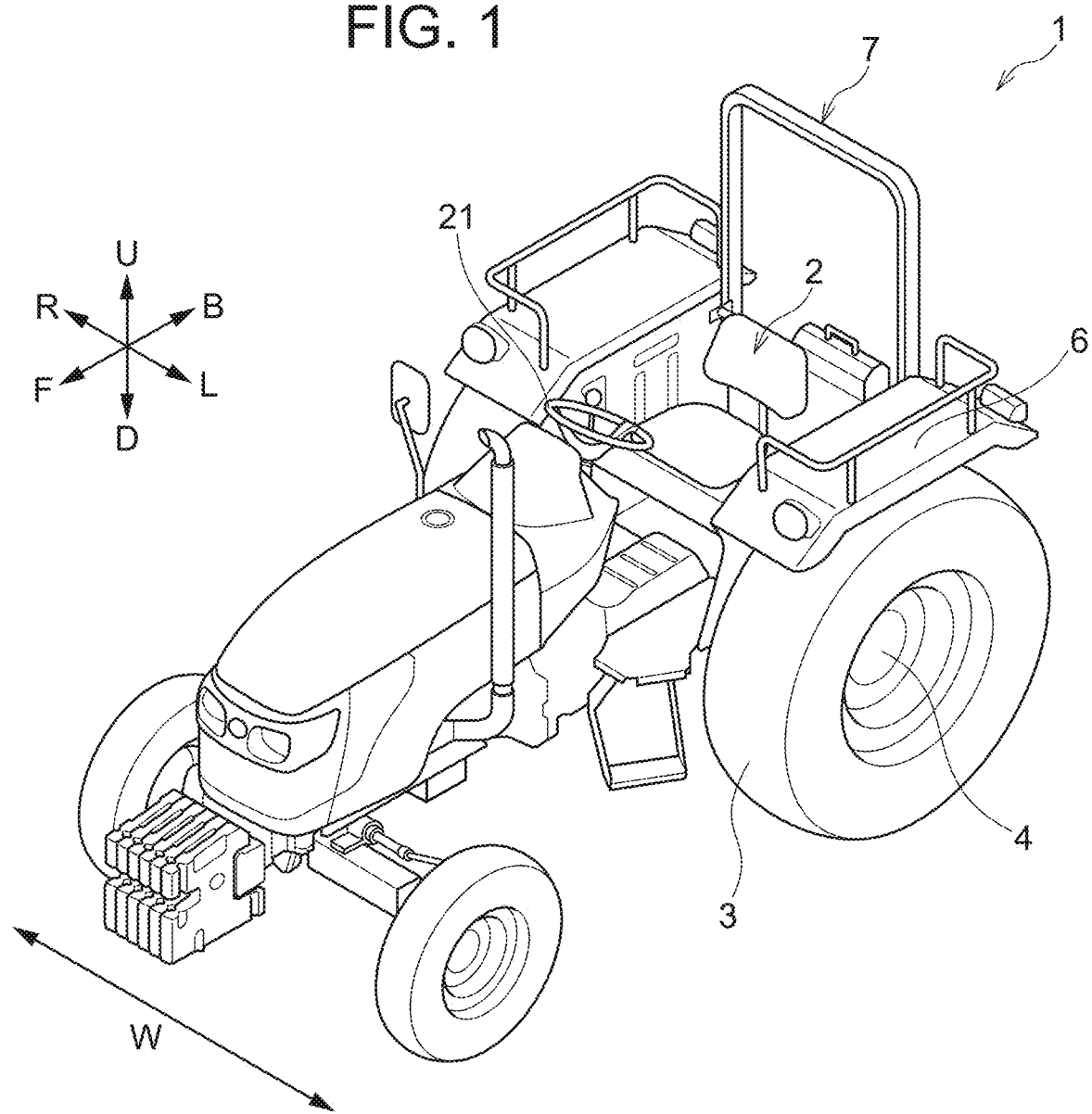
FIG. 1 is a perspective view of an example of the whole configuration of a work vehicle 1 according to a preferred embodiment of the present invention.

Preferred embodiments of the present invention will be described in detail with reference to the accompanying drawings. In the following drawings, the same or similar reference numerals denote the same or similar portions. However, it should be noted that the drawings are schematic, and the proportions of each dimension are different from the actual figures. Therefore, specific dimensions should be determined in consideration of the following explanation. Further, the drawings may include portions having different dimensional relationships and ratios between the drawings. In the present specification and drawings, elements having substantially the same functions and structures are denoted by the same reference numerals, and redundant description thereof is omitted, and elements not directly related to preferred embodiments of the present invention are omitted from the drawings.

First Preferred Embodiment

A work vehicle 1 according to a first preferred embodiment of the present invention will be described hereinbelow with reference to FIGS. 1 to 5.

Figure 2:
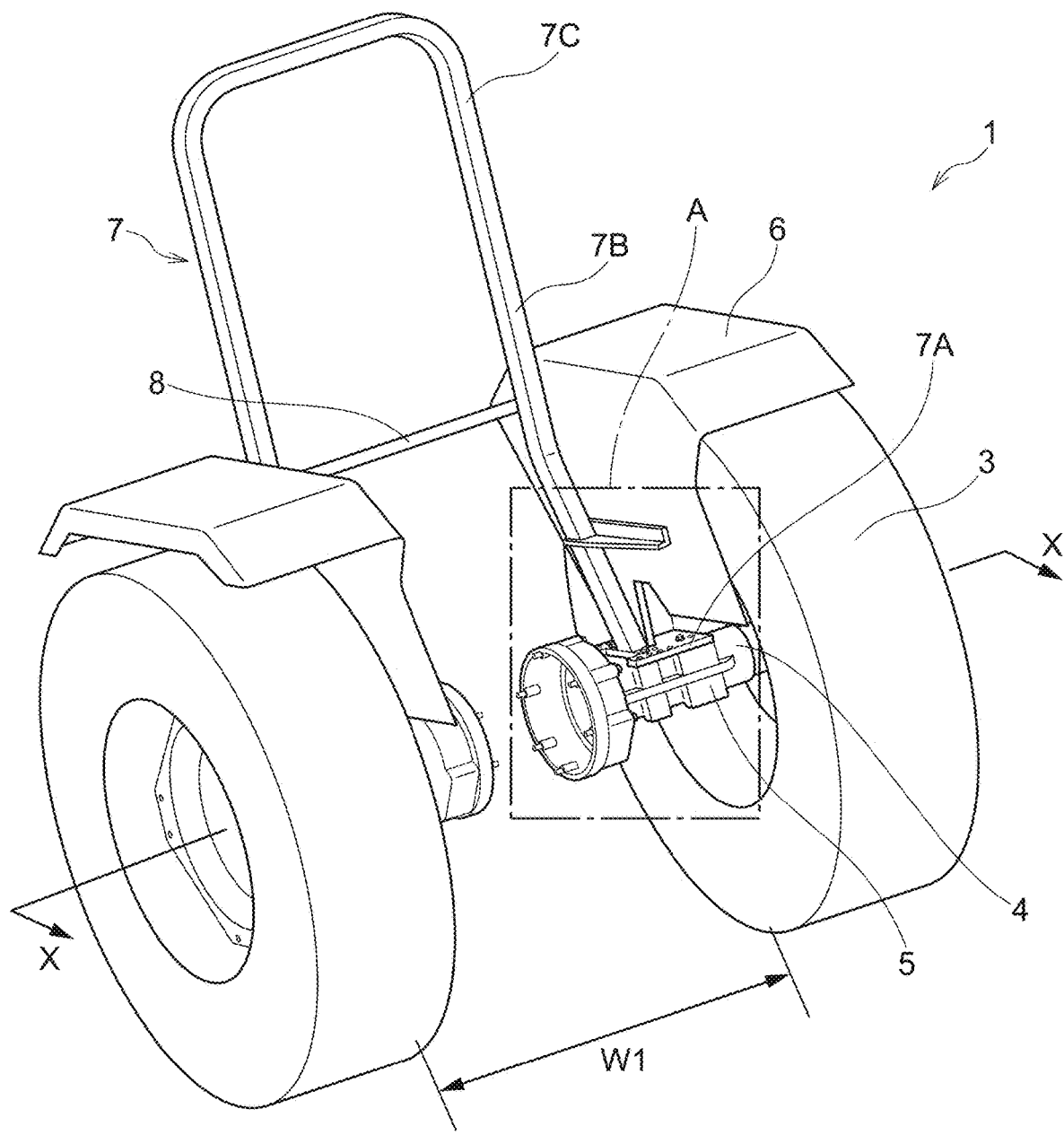
FIG. 2 is a diagram to illustrate an example of a mechanism for adjusting a length W1 in a width direction W between rear wheels 3 of the work vehicle 1 according to a preferred embodiment of the present invention.
Figure 3:
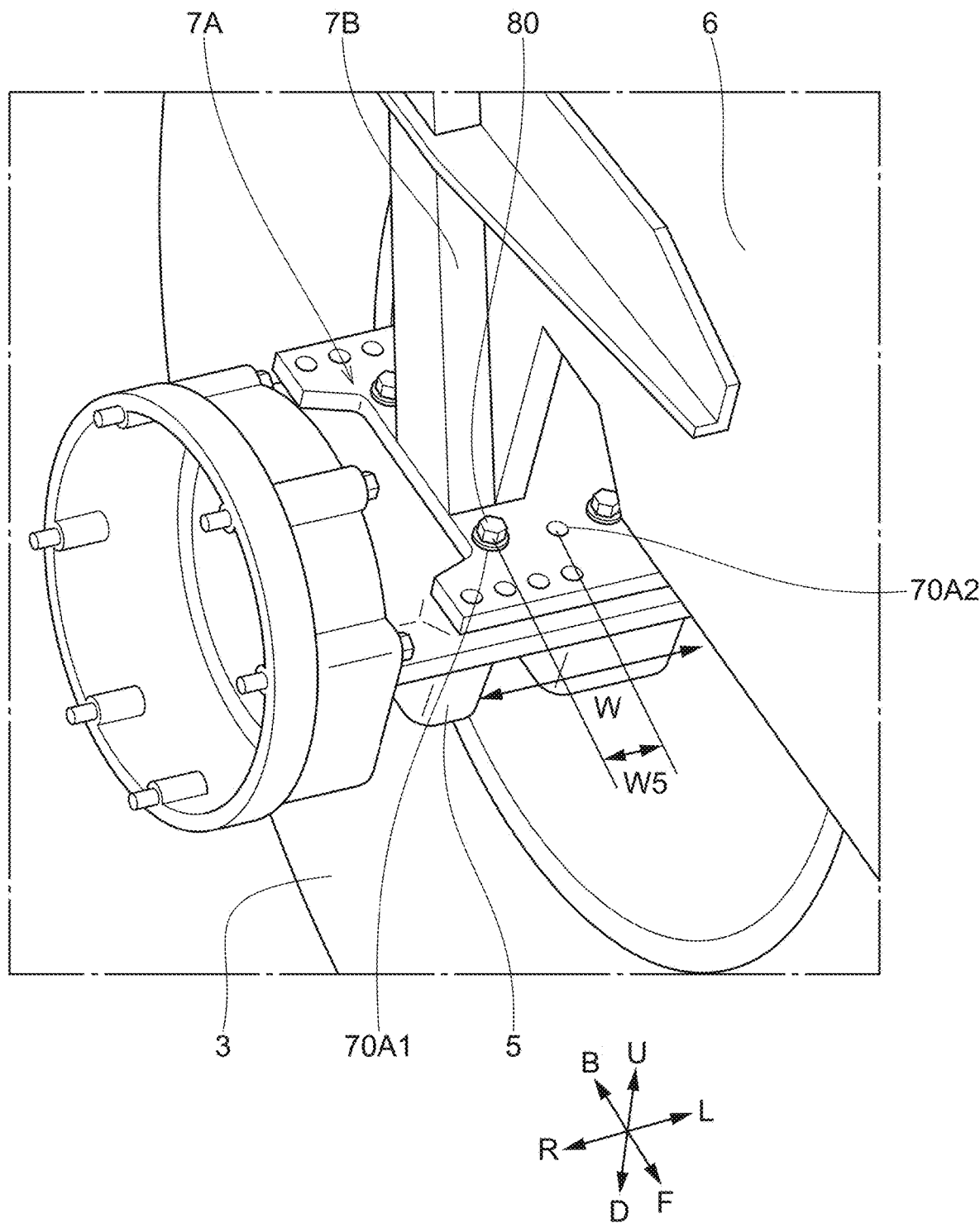
FIG. 3 is an enlarged view of section A in FIG. 2.
Figure 4:
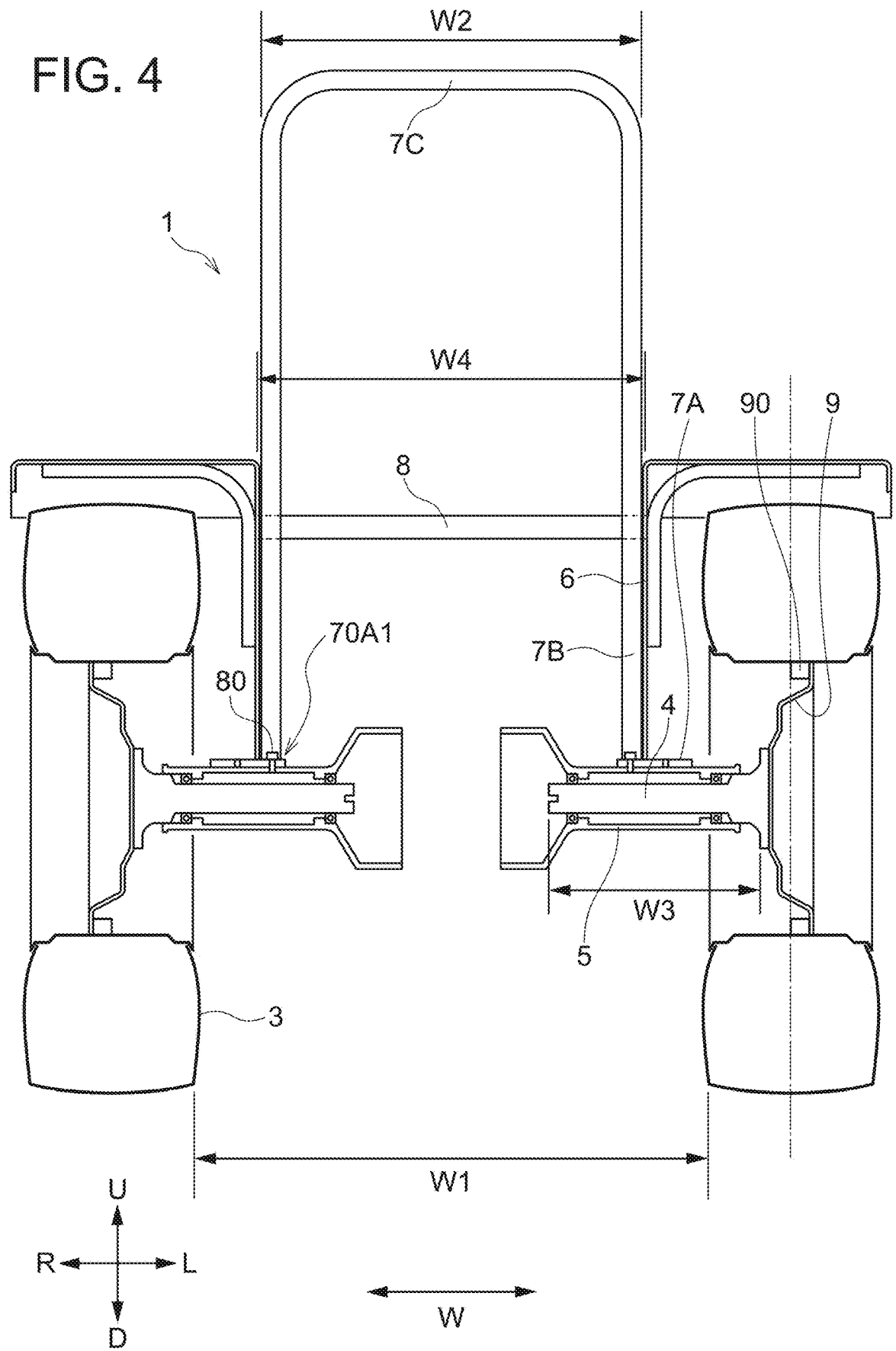
FIG. 4 is a cross-sectional view taken along line X-X of FIG. 2.
Figure 5:
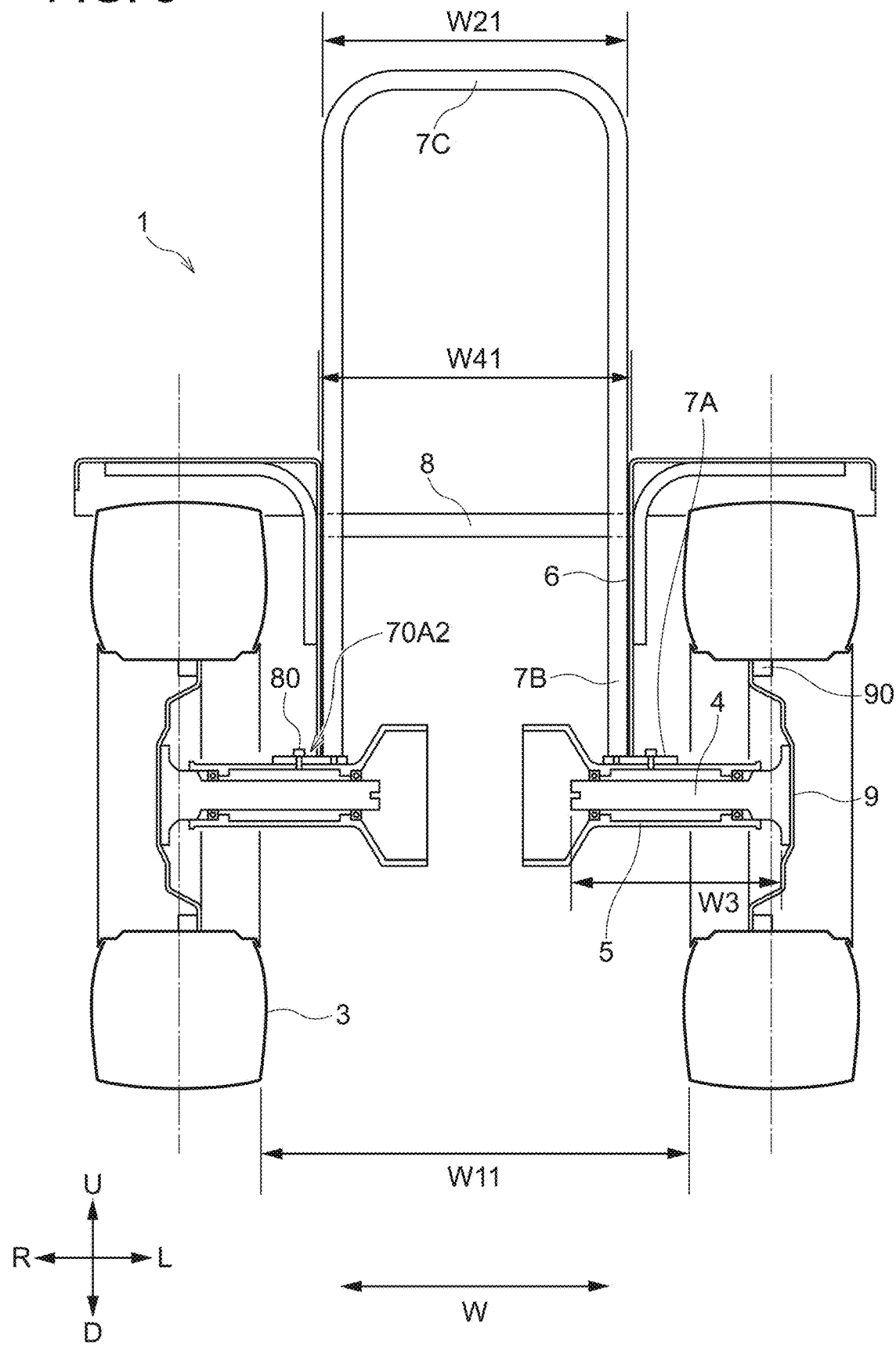
FIG. 5 is a diagram to illustrate an example of a case in which the length W1 in the width direction W between a pair of left and right rear wheels in FIG. 4 is changed.

FIG. 1 is a perspective view of an example of the whole configuration of a work vehicle 1 according to the present preferred embodiment. FIG. 2 is a diagram to illustrate an example of a mechanism to adjust a length W1 in a width direction W between the rear wheels 3 of the work vehicle 1 according to the present preferred embodiment. FIG. 3 is an enlarged view of section A in FIG. 2. FIG. 4 is a cross-sectional view taken along line X-X of FIG. 2. FIG. 5 is a diagram to illustrate an example of a case in which the length W1 in the width direction W between a pair of left and right rear wheels in FIG. 4 is changed.

The work vehicle 1 according to the present preferred embodiment is a tractor. However, the work vehicle 1 is not limited to a tractor, and may be an agricultural machine (agricultural vehicle) such as a combine harvester or a transplant machine, or may be a construction machine (construction vehicle) such as a loader work machine.

As shown in FIGS. 1 and 2, the work vehicle 1 according to the present preferred embodiment includes a driver seat 2, a pair of left and right rear wheels 3, a pair of left and right rear axles 4, a pair of left and right rear axle cases 5, a pair of left and right rear wheel fenders 6, and a safety frame 7.

As shown in FIG. 1, the driver seat 2 is provided at the rear (B) of the work vehicle 1. A steering wheel 21 is disposed in front (F) of the driver seat 1. An operation lever (not illustrated) is disposed on the sides (R, L) of the driver seat 1. Further, an engine (not illustrated) is mounted in front (F) of the driver seat 1.

As shown in FIGS. 1 and 2, the pair of left and right rear wheels 3 are rotatably mounted on the pair of left and right rear axles 4.

As shown in FIGS. 2 to 5, the pair of left and right rear axle cases 5 support the pair of left and right rear axles 4. As shown in FIG. 2, the pair of left and right rear wheel fenders 6 are disposed on the left and right sides (R, L) of the driver seat 2 and cover the upper side (U) of the pair of left and right rear wheels 3.

As shown in FIGS. 1 to 5, the safety frame 7 is provided between the pair of left and right rear wheel fenders 6 at the rear (B) of the driver seat 2. Note that the safety frame is also referred to as a "roll-over protective structure (ROPS)".

As shown in FIGS. 4 and 5, the work vehicle 1 according to the present preferred embodiment may further include a rod-shaped support 8 that extends along the width direction W between the pair of left and right rear wheel fenders 6 and is fastened to the pair of left and right rear wheel fenders 6.

Furthermore, as shown in FIGS. 4 and 5, the work vehicle 1 according to the present preferred embodiment may further include a wheel 9 that is removably connected to the rear axles 4. Here, as shown in FIGS. 4 and 5, the rear wheels 3 are mounted on the rear axles 4 with the wheel 9 interposed therebetween.

As shown in FIG. 2, the safety frame 7 includes a base 7A, a pair of left and right lower frames 7B, and an upper frame 7C.

As shown in FIG. 3, the base 7A is removably fastened to the pair of left and right rear axle cases 5.

As shown in FIGS. 3 to 5, the base 7A is provided with a plurality of fastening holes 70A1 and 70A2 that are used when the base 7A is fastened to the rear axle cases 5 and that are aligned in the width direction W.

Hereinafter, in the present preferred embodiment, the fastening hole 70A1 on the innermost side in the width direction W is referred to as an "inner fastening hole", and the fastening hole 70A2 on the outermost side in the width direction W is referred to as an "outer fastening hole" (see FIGS. 3 to 5).

Note that, in the present preferred embodiment, as illustrated in FIGS. 3 to 5, a case where the two fastening holes 70A1 and 70A2 are provided has been described, but the present invention is not limited to such a case, and is also applicable to a case where three or more fastening holes are provided.

In the examples of FIGS. 3 and 4, the base 7A is fastened to the rear axle cases 5 by fitting a fastening member (for example, a bolt or the like) 80 into the inner fastening hole 70A1. Note that the base 7A may be fastened to the rear axle cases 5 by fitting a fastening member (for example, a bolt or the like) 80 into the outer fastening hole 70A2.

As shown in FIGS. 2 to 5, the pair of left and right lower frames 7B rise from the base 7A and are fastened to the pair of left and right rear wheel fenders 6.

As shown in FIGS. 2 to 5, the upper frame 7C has an inverted U shape connecting upper portions of the pair of left and right lower frames 7B.

Here, in the work vehicle 1 according to the present preferred embodiment, by changing the length W2 in the width direction W of the upper frame 7C and changing the fastening position of the base 7A to the rear axle cases 5, the length (hereinafter "tire width") W1 in the width direction W between the pair of left and right rear wheels 3 can be changed.

As described above, in the work vehicle 1 according to the present preferred embodiment, in a case where the support 8 is provided, a length W4 in the width direction W of the support 8 is also changed when the tire width W1 is changed.

For example, in the work vehicle 1 according to the present preferred embodiment, the tire width W1 can be changed by preparing the upper frame 7C and the support 8 having different lengths, removing the currently used upper frame 7C and the support 8, mounting the upper frame 7C and the support 8 corresponding to a desired tire width, fitting the fastening member 80 into the fastening hole fastening holes 70A1 and 70A2 corresponding to the desired tire width, and fastening a base 7A to the rear axle cases 5.

Note that preferred embodiments of the present invention are also applicable to cases where the length W2 in the width direction W of the upper frame 7C and the length W4 in the width direction W of the support 8 are changed by other methods.

Hereinafter, an example of a case where the tire width is changed in the work vehicle 1 according to the present preferred embodiment will be described with reference to FIGS. 4 and 5.

In the example of FIG. 4, in the work vehicle 1 according to the present preferred embodiment, the base 7A is fastened to the rear axle cases 5 by fitting the fastening member 80 into the inner fastening hole 70A1.

In the example of FIG. 4, the tire width is W1, the length in the width direction W of the upper frame 7C is W2, the length in the width direction W of the rear axles 4 is W3, and the length in the width direction W of the support 8 is W4.

In the example of FIG. 4, the wheel 9 is connected to the outside in the width direction W of a protrusion 90 of the rear wheels 3.

Here, in the work vehicle 1 according to the present preferred embodiment, in a case where it is desired to narrow the tire width, as shown in FIG. 4 and FIG. 5, the left-right direction (R/L) of the wheel 9 is reversed, the currently used upper frame 7C and the support 8 are removed, the upper frame 7C and the support 8 corresponding to the tire width to be narrowed are mounted, and the fastening member 80 is fitted into the outer fastening hole 70A2 to fasten the base 7A to the rear axle cases 5.

As a result, in the example of FIG. 5, the tire width is changed to W11, the length in the width direction W of the upper frame 7C is changed to W21, and the length in the width direction W of the support 8 is changed to W41. However, the length in the width direction W of the rear axles 4 remains W3.

At this time, as shown in FIG. 5, the wheel 9 is connected to the inner side of the protrusion 90 of the rear wheels 3 in the width direction W. As a result, the rear wheels 3 move inward in the width direction W, and the tire width is narrowed.

Note that, in the work vehicle 1 according to the present preferred embodiment, the following equation is established.

$$W_{min2} - W_{min1} = W5 \times 2$$

Here, "$W_{min2}$" is a minimum value of the tire width that can be taken by an attachable tire when the fastening member 80 is fitted into the inner fastening hole 70A1 and the base 70A is fastened and attached to the rear axle cases 5 (in the present preferred embodiment, W1); "$W_{min1}$" is a minimum value of a tire width that can be taken by an attachable tire when the fastening member 80 is fitted into the outer fastening hole 70A2 and the base 7A is fastened and attached to the rear axle cases 5 (in the present preferred embodiment, W11); and "W5" is a length in the width direction W between the inner fastening hole 70A1 and the outer fastening hole 70A2.

That is, in a case where $W1=W_{min2}$, the tire width that can be narrowed by changing the fastening member 80 from the inner fastening hole 70A1 to the outer fastening hole 70A2 is within the range of W5×2 or less.

Hereinafter, advantageous effects achieved by the work vehicle 1 according to the present preferred embodiment will be described.

A work vehicle 1 according to the present preferred embodiment includes a driver seat 2 at the rear (B) of the work vehicle 1, a pair of left and right rear axles 4 on which a pair of left and right rear wheels 3 are mounted, a pair of left and right rear axle cases 5 to support the pair of left and right rear axles 4, a pair of left and right rear wheel fenders 6 on left and right sides (R, L) of the driver seat 2 to cover an upper side (U) of the pair of left and right rear wheels 3, and a safety frame 7 between the pair of left and right rear wheel fenders 6 at the rear (B) of the driver seat 2, wherein the safety frame 7 includes a base 7A, a pair of left and right lower frames 7B rising from the base 7A and fastened to the pair of left and right rear wheel fenders 6, and an upper frame 7C having an inverted U shape connecting upper portions of the pair of left and right lower frames 7B, wherein the base 7A is removably fastened to the rear axle cases 5 to change a length W1 in the width direction W between the pair of left and right rear wheels 3 by changing a length W2 in the width direction W of the upper frame 7C and changing a fastening position of the base 7A to the rear axle cases 5.

With such a configuration, the tire width can be adjusted without complicating the shape of the rear wheel fenders 6. In addition, with such a configuration, because the tire width can be adjusted while the safety frame 7 (lower frame 7B) and the rear wheel fenders 6 are fastened, the number of work steps can be reduced.

In the work vehicle 1 according to the present preferred embodiment, the base 7A may be provided with a plurality of fastening holes 70A1 and 70A2 that are used when the base 7A is fastened to the rear axle cases 5 and that are aligned in the width direction W.

With such a configuration, by changing the fastening holes 70A1 and 70A2 into which the fastening member 80 is fitted, the fastening position of the base 7A to the rear axle cases 5 can be easily changed.

The work vehicle 1 according to the present preferred embodiment may further include a rod-shaped support 8 extending along the width direction W between the pair of left and right rear wheel fenders 6 and fastened to the pair of left and right rear wheel fenders 6, and the length W4 in the width direction W of the support 8 may be changed when the tire width is changed.

With such a configuration, the tire width can be adjusted even in a work vehicle 1 provided with the support 8 to improve the strength of the rear wheel fenders 6 in the width direction W.

The work vehicle 1 according to the present preferred embodiment may further include a wheel 9 that is removably connected to the rear axles 4. The rear wheels 3 may be mounted on the rear axles 4 with the wheel 9 interposed therebetween, and the left-right direction of the wheel 9 may be reversed when the tire width is changed.

With such a configuration, the tire width can be adjusted using the same wheel 9.

Although the present invention has been described in detail with reference to the preferred embodiments described above, it will be apparent to those skilled in the art that the present invention is not limited to the preferred embodiments described herein. The present invention may be practiced as modifications and variations without departing from the spirit and scope of the present invention as defined by the claims. Accordingly, the description herein is intended to be illustrative and has no restrictive meaning with respect to the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A work vehicle, comprising:
   a driver seat at a rear of the work vehicle;
   a pair of left and right rear axles on which a pair of left and right rear wheels are mounted;
   a pair of left and right rear axle cases to support the pair of left and right rear axles;
   a pair of left and right rear wheel fenders on left and right sides of the driver seat to cover an upper side of the pair of left and right rear wheels; and
   a safety frame between the pair of left and right rear wheel fenders at a rear of the driver seat; wherein
   the safety frame includes:
   a base;
   a pair of left and right lower frames extending from the base and fastened to the pair of left and right rear wheel fenders; and
   an upper frame having an inverted U shape connecting upper portions of the pair of left and right lower frames;
   the base is removably fastened to the rear axle cases; and
   a length in a width direction between the pair of left and right rear wheels is changed by changing a length in a width direction of the upper frame and changing a fastening position of the base to the rear axle cases.

2. The work vehicle according to claim 1, wherein the base is provided with a plurality of fastening holes that are usable when the base is fastened to the rear axle cases and that are aligned in the width direction.

3. The work vehicle according to claim 1, further comprising:
   a rod-shaped support extending along the width direction between the pair of left and right rear wheel fenders and fastened to the pair of left and right rear wheel fenders; wherein
   a length in a width direction of the support is changed when the length in the width direction between the pair of left and right rear wheels is changed.

4. The work vehicle according to claim 1, further comprising:
   a wheel that is removably connected to the left rear axle or the right rear axle; wherein
   the left rear wheel is mounted to the left rear axle;
   the right rear wheel is mounted to the right rear axle;
   the wheel is interposed between the left rear wheel and the left rear axle when the wheel is removably connected to the left rear axle;
   the wheel is interposed between the right rear wheel and the right rear axle when the wheel is removably connected to the right rear axle; and
   when the length in the width direction between the pair of left and right rear wheels is changed, a left-right direction of the wheel is reversed.

* * * * *